US012574907B2

(12) United States Patent
Mu

(10) Patent No.: US 12,574,907 B2
(45) Date of Patent: Mar. 10, 2026

(54) COMMUNICATION METHOD AND COMMUNICATION DEVICE FOR TYPE 0-CCS, AND STORAGE MEDIUM

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 348 days.

(21) Appl. No.: 18/270,418

(22) PCT Filed: Dec. 30, 2020

(86) PCT No.: PCT/CN2020/141774
§ 371 (c)(1),
(2) Date: Jun. 29, 2023

(87) PCT Pub. No.: WO2022/141288
PCT Pub. Date: Jul. 7, 2022

(65) Prior Publication Data
US 2024/0057046 A1       Feb. 15, 2024

(51) Int. Cl.
*H04W 72/0446*       (2023.01)
*H04W 72/51*       (2023.01)

(52) U.S. Cl.
CPC ....... *H04W 72/0446* (2013.01); *H04W 72/51* (2023.01)

(58) Field of Classification Search
CPC . H04W 72/0446; H04W 72/51; H04W 48/12; H04W 48/16; H04L 5/0005;
(Continued)

(56) References Cited

U.S. PATENT DOCUMENTS 10,306,546 B2     5/2019   Park et al.
2019/0363843 A1    11/2019   Gordaychik
(Continued)

FOREIGN PATENT DOCUMENTS

CN       111758238 A     10/2020
CN       111819813 A     10/2020
(Continued)

OTHER PUBLICATIONS

ISA State Intellectual Property Office of the People's Republic of China, International Search Report Issued in Application No. PCT/CN2020/141774, Oct. 8, 2021, WIPO, 4 pages.
(Continued)

*Primary Examiner* — Chae S Lee
(74) *Attorney, Agent, or Firm* — Volpe Koenig

(57) ABSTRACT

The present disclosure relates to communication methods, communication devices and storage media. The communication method includes determining the number of first slots, where the number of the first slots is the number of slots in which a first type Common Search Space (CSS) is monitored within a first period, and the number of the first slots is greater than the number of second slots. The number of the first slots is the number of slots in which the first type CSS is monitored by a first type terminal within the first period; the number of the second slots is the number of slots in which the first type CSS is monitored by a second type terminal within the first period.

12 Claims, 4 Drawing Sheets

S31
Determine, for each of the second slots, monitoring symbols for the second slot in a first manner S32
Determine, for each of one or more other slots besides the second slots in the first slots, monitoring symbols for the slot in a second manner

(58) Field of Classification Search

CPC ....... H04L 1/08; H04L 5/0053; H04L 5/0048; H04L 5/006

See application file for complete search history.

(56) References Cited

U.S. PATENT DOCUMENTS

| | | | |
|---|---|---|---|
| 2020/0260418 A1 | 8/2020 | Xue et al. | |
| 2020/0329494 A1* | 10/2020 | Mondal | H04W 74/0808 |
| 2022/0248435 A1* | 8/2022 | Lin | H04W 72/0446 |
| 2022/0271894 A1* | 8/2022 | Li | H04L 5/0048 |

FOREIGN PATENT DOCUMENTS

| | | | |
|---|---|---|---|
| CN | 111901085 A | 11/2020 | |
| CN | 111934834 A | 11/2020 | |
| EP | 4138482 A1 | 2/2023 | |
| WO | WO-2020072963 A1 * | 4/2020 | H04L 5/0053 |

OTHER PUBLICATIONS

Vivo et al., "Reduced PDCCH monitoring for Reduced Capability NR devices", 3GPP TSG RAN WG1 #103-e, R1-2007669, Nov. 13, 2020 (Nov. 13, 2020), 12 pages.

NEC, "Reduced PDCCH monitoring for REDCAP NR devices", 3GPP TSG RAN WGI#103-e, R1-2008115, Nov. 13, 2020 (Nov. 13, 2020), 3 pages.

European Patent Office, Extended European Search Report Issued in Application No. 20967628.7, Jan. 29, 2024, Germany, 12 pages.

ZTE:"Discussion on coverage recovery for RedCap UE", 3GPP TSG RAN WG1 Meeting #103-e, R1-2007717,e-Meeting, Oct. 26-Nov. 13, 2020, 17 pages.

Interdigital et al:"Coverage recovery for reduced capability NR devices", 3GPP TSG RAN WG1 #103-e, R1-2008686, e-Meeting, Oct. 26-Nov. 13, 2020,8 pages.

3rd Generation Partnership Project;Technical Specification Group Radio Access Network;NR; Physical layer procedures for control (Release 16), XP051893821,vol. RAN WG1,No. V16.1.03 Apr. 2020, 156 pages.

State Intellectual Property Office of the People's Republic of China, Office Action and Search Report Issued in Application No. 2020800043918, Oct. 7, 2023, 9 pages.

ISA State Intellectual Property Office of the People's Republic of China, Written Opinion of the International Searching Authority Issued in Application No. PCT/CN2020/141774, Oct. 8, 2021, WIPO, 6 pages.

Intellectual property India, Office Action Issued in Application No. 202317048611, Mar. 24, 2025, 5 pages.

Vivo, "Performance evaluation of XR traffic", R1-2007699, 3GPP TSG RAN WG1 #103-e, e-Meeting, Oct. 26-Nov. 13, 2020, 12 pages.

* cited by examiner

Network device

Terminal

Terminal

Determine the number of first slots

S11

Determine monitoring symbols for each of the first slots

S21

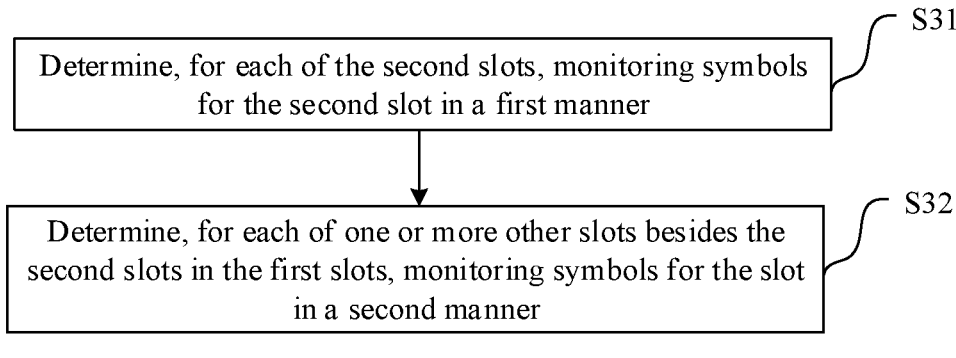

S31

Determine, for each of the second slots, monitoring symbols for the second slot in a first manner

S32

Determine, for each of one or more other slots besides the second slots in the first slots, monitoring symbols for the slot in a second manner

Determine a first set of monitoring symbols for each slot based on a mapping correspondence of SSB mapping patterns and SCS

Determine a start monitoring symbol in the first set of monitoring symbols

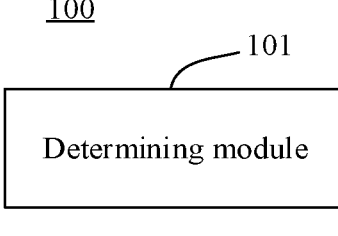

Determining module

FIG.7

COMMUNICATION METHOD AND COMMUNICATION DEVICE FOR TYPE 0-CCS, AND STORAGE MEDIUM

CROSS REFERENCE TO RELATED APPLICATIONS

The present application is a U.S. national phase of PCT Application No. PCT/CN2020/141774, filed on Dec. 30, 2020, which is incorporated herein by reference in its entirety.

TECHNICAL FIELD

The present disclosure relates to the field of wireless communication technologies, in particular to communication methods and communication devices, and storage media.

BACKGROUND

In a wireless communication system, Machine Type Communication (MTC) and Narrow Band Internet of Things (NB IoT) technologies have been proposed for scenarios such as IoT services with a low rate and high latency.

With the development of IoT services, MTC and NB IoT technologies are not able to meet the rate and latency needs of current IoT services. Therefore, a new terminal, for example, a Reduced Capability UE (abbreviated as RedCap UE or NR lite), is designed to cover the needs of IoT services. Because the RedCap UE is designed to be low cost, low complexity, and has a reduction in the number of antennas and bandwidth, the coverage capacity of the Red-Cap UE is reduced, and coverage enhancement is needed. In related art, there are two slots for monitoring type 0 Common Search Space (type 0 CSS) within a period, so at most two repetitions can be performed. However, for broadcasting a Physical Downlink Control Channel (PDCCH), performing two repetitions cannot compensate for the reduced coverage.

SUMMARY

To overcome the technical problems in the related art, embodiments of the present disclosure provide communication methods and communication devices, and storage media.

According to a first aspect of the embodiments of the present disclosure, there is provided a communication method. The communication method includes: determining a number of first slots, where the number of the first slots includes a number of slots for monitoring first type Common Search Space (CSS) within a first period, the number of the first slots is greater than a number of second slots, the number of the first slots includes the number of slots for a first type terminal to monitor the first type CSS within the first period, and the number of the second slots includes a number of slots for a second type terminal to monitor the first type CSS within the first period.

In an implementation, the UE capability of the first type terminal is lower than the UE capability of the second type terminal.

In an implementation, the method further includes: determining monitoring symbols for each of the first slots.

In an implementation, the first slots include the second slots, and determining the monitoring symbols for each of the first slots includes: determining, for each of the second slots, monitoring symbols for the second slot with a first manner; and determining, for each of one or more other slots besides the second slots in the first slots, monitoring symbols for the slot with a second manner; where the second manner is different from the first manner.

In an implementation, determining the monitoring symbols for the slot with the second manner includes: determining, based on a mapping correspondence of Synchronization Signal Block (SSB) mapping patterns and SubCarrier Spacing (SCS), a first set of monitoring symbols for the slot.

In an implementation, the method further includes: determining a start monitoring symbol in the first set of monitoring symbols.

In an implementation, for mapping correspondences of SSB mapping patterns and SCS, symbols included in the corresponding first sets of monitoring symbols are different.

In an implementation, time-domain positions of symbols included in the first set of monitoring symbols are different from time-domain positions of SSB transmission resources, and the time-domain positions of symbols included in the first set of monitoring symbols are different from time-domain positions of transmission resources of the first type CSS.

In an implementation, prior to determining the number of the first slots, the communication method further includes: determining whether one or more slots other than the second slots in the first slots are for an SSB transmission.

In an implementation, prior to determining the number of the first slots, the communication method further includes: determining that a duplexing mode is Time Division Duplexing (TDD).

In an implementation, prior to determining the number of the first slots, the communication method further includes: determining that a duplexing mode is Frequency Division Duplexing (FDD), and determining that the first sets of monitoring symbols corresponding to the first slots further include second sets of monitoring symbols in the FDD mode.

In an implementation, the number of the first slots is a predefined value; or the number of the first slots is determined based on a Synchronization Signal Block (SSB).

According to a second aspect of the embodiments of the present disclosure, there is provided a communication device. The communication device includes: a determining module, configured to determine a number of first slots, where the number of the first slots includes a number of slots for monitoring the first type Common Search Space (CSS) within a first period, the number of the first slots is greater than a number of second slots, the number of the first slots includes the number of slots for a first type terminal to monitor the first type CSS within the first period, and the number of the second slots includes a number of slots for a second type terminal to monitor the first type CSS within the first period.

In an implementation, the UE capability of the first type terminal is lower than the UE capability of the second type terminal.

In an implementation, the determining module is further configured to determine monitoring symbols for each of the first slots.

In an implementation, the first slots include the second slots, and determining the monitoring symbols for each of the first slots includes: determining, for each of the second slots, monitoring symbols for the second slot with a first manner; and determining, for each of one or more other slots besides the second slots in the first slots, monitoring symbols for the slot with a second manner; where the second manner is different from the first manner.

In an implementation, the determining module is configured to determine, based on a mapping correspondence of Synchronization Signal Block (SSB) mapping patterns and SubCarrier Spacing (SCS), a first set of monitoring symbols for the slot.

In an implementation, the determining module is further configured to determine a start monitoring symbol in the first set of monitoring symbols.

In an implementation, for mapping correspondences of SSB mapping patterns and SCS, symbols included in the corresponding first sets of monitoring symbols are different.

In an implementation, time-domain positions of symbols included in the first set of monitoring symbols are different from time-domain positions of SSB transmission resources, and the time-domain positions of symbols included in the first set of monitoring symbols are different from time-domain positions of transmission resources of the first type CSS.

In an implementation, the determining module is further configured to determine whether one or more slots other than the second slots in the first slots are for an SSB transmission.

In an implementation, the determining module is further configured to determine that a duplexing mode is Time Division Duplexing (TDD).

In an implementation, the determining module is further configured to determine that a duplexing mode is Frequency Division Duplexing (FDD), and determine that the first sets of monitoring symbols corresponding to the first slots further include second sets of monitoring symbols in the FDD mode.

In an implementation, the determining module is further configured to determine the number of the first slots as a predefined value; or determine the number of the first slots based on a Synchronization Signal Block (SSB).

According to a third aspect of the embodiments of the present disclosure, there is provided a communication device including: a processor; and a memory storing instructions executable by the processor, where the processor is configured to perform the communication method according to the first aspect or any one of the embodiments in the first aspect.

According to a fourth aspect of the embodiments of the present disclosure, there is provided a non-transitory computer-readable storage medium, when instructions in the storage medium are executed by a processor of a mobile terminal, the mobile terminal is caused to perform the communication method according to the first aspect or any one of the embodiments in the first aspect.

Technical solutions provided by the embodiments of the present disclosure may include the following beneficial effects. The number of first slots is determined through the present disclosure, where the number of first slots is the number of slots for a first type terminal to monitor the first type common search space during a first period. Therefore, the number of slots for the first type terminal to perform monitoring is increased, thereby allowing for more repetition transmissions to compensate for the coverage loss.

It should be understood that the above general description and the following detailed description are just exemplary and explanatory, and cannot be construed as a limit to the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

FIG. 4 is a flowchart illustrating yet another communication method according to an example embodiment.

FIG. 5 is a flowchart illustrating yet another communication method according to an example embodiment.

FIG. 6 is a flowchart illustrating yet another communication method according to an example embodiment.

FIG. 7 is a block diagram illustrating a communication device according to an example embodiment.

DETAILED DESCRIPTION OF THE EMBODIMENTS

Figure 1:
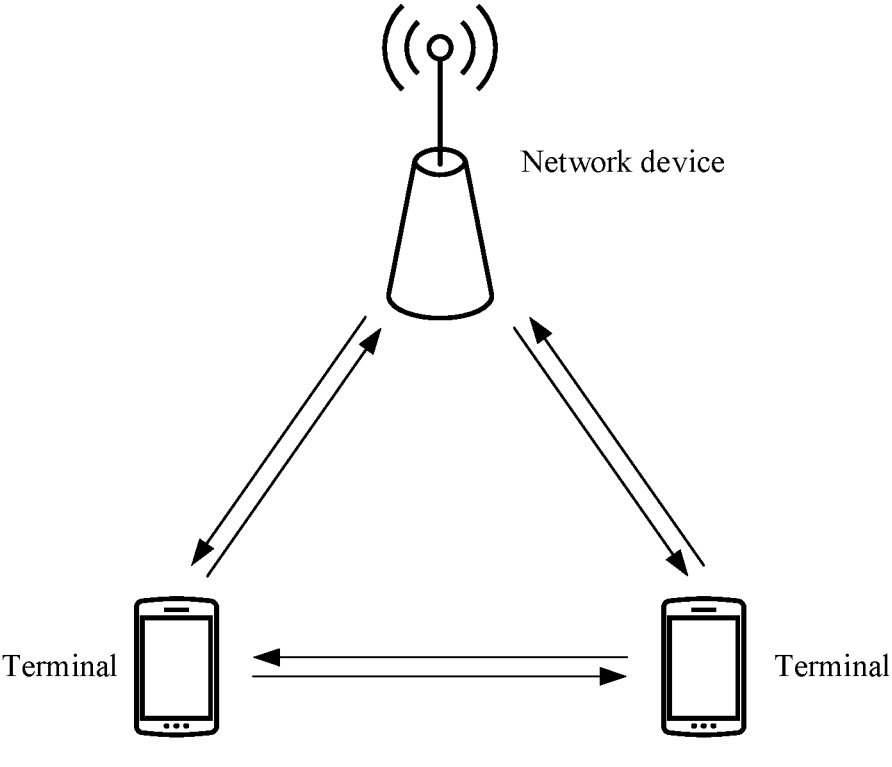
FIG. 1 is an architecture diagram illustrating a communication system of a network device and terminals according to an example embodiment.

Exemplary embodiments will be described in detail herein, with the illustrations thereof represented in the drawings. When the following descriptions involve the drawings, like numerals in different drawings refer to like or similar elements unless otherwise indicated. The manners described in the following exemplary embodiments do not represent all manners consistent with embodiments of the present disclosure. Rather, they are merely examples of apparatuses and methods consistent with some aspects of the present disclosure as detailed in the appended claims.

FIG. 1 is an architecture diagram illustrating a communication system of a network device and terminals according to an example embodiment. The communication methods provided by the present disclosure can be applied to the communication system shown in FIG. 1. As shown in FIG. 1, the network device can transmit signaling based on the architecture shown in FIG. 1.

It can be understood that the communication system of the network device 10 and terminals 12, 14 shown in FIG. 1 is for schematic illustration only. Other network devices can be further included in the communication system, for example, a core network device, a wireless relay device, and a wireless backhaul device or the like can be further included, which are not shown in FIG. 1. The number of network devices and the number of terminals included in the communication system are not limited in the embodiments of the present disclosure.

It can be further understood that the communication system in the embodiments of the present disclosure indicates a network that provides wireless communication functions. The communication system can employ different communication technologies, such as Code Division Multiple Access (CDMA), Wideband Code Division Multiple Access (WCDMA), Time Division Multiple Access (TDMA), Frequency Division Multiple Access (FDMA), Orthogonal Frequency-Division Multiple Access (OFDMA), Single Carrier FDMA (SC-FDMA), and Carrier Sense Multiple Access with Collision Avoidance. Depending on the capacity, rates, and latency of different networks, the network can be classified as a 2nd Generation (2G) network, 3G network, 4G network, or a future evolution network (e.g., 5G network, which can also be referred to as New Radio (NR) network). For ease of description, the network that provides wireless communication functions is sometimes referred to as a network simply in the present disclosure.

Further, the network device involved in the present disclosure can be called a wireless access network device as well. The wireless access network device may be: a base station, an evolved Node B (eNB), a home base station, an Access Point (AP) in a Wireless-Fidelity (WI-FI) system, a wireless relay node, a wireless backhaul node, a Transmission Point (TP) or a Transmission and Reception Point (TRP), a next generation Node B (gNB) in NR system, or a component or partial devices constituting a base station and the like. In a case where the communication system is a vehicle-to-vehicle (V2X) communication system, the network device may also be an in-vehicle device. It should be understood that specific technologies and specific device forms used for the network device are not limited to the embodiments of the present disclosure.

Further, the terminal involved in the present disclosure, which can be referred to as a terminal device, a User Equipment (UE), a Mobile Station (MS), a Mobile Terminal (MT), etc., is a device that provides voice and/or data connectivity to a user. For example, the terminal may be a handheld device, a vehicle-mounted device, or the like that has wireless connectivity. Currently, some examples of the terminal can include: smartphone, Pocket Personal Computer (PPC), palmtop, Personal Digital Assistant (PDA), laptop, tablet, wearable device, or in-vehicle device, etc. In addition, in a case where the communication system is a vehicle-to-vehicle (V2X) communication system, the terminal device may also be an in-vehicle device. It should be understood that specific technologies and the specific device forms used for the terminal are not limited to the embodiments of the present disclosure.

In communication systems such as Long Term Evolution (LTE) 4th Generation Mobile Communication Technology (4G) system, to support Internet of Things (IoT) services, Machine Type Communication (MTC) and Narrow Band Internet of Things (NB-IoT) are proposed. These two technologies are mainly targeted at low-rate and high-latency scenarios, for example, meter reading and environment monitoring. The NB-IoT technology currently supports a maximum transmission rate of several hundred kbps (thousand bits per second), while the MTC technology currently supports a maximum transmission rate of several Mbps (million bits per second). However, with the continuous development of IoT services, for example, with the popularization of services such as video surveillance, smart home, wearable devices, and industrial sensing monitoring, these services require transmission rates ranging from tens of Mbps to 100 Mbps, while these services also have relatively high requirements for latency. Thus, it is difficult for the MTC technology and NB-IoT technology in LTE to meet the needs of the above services. Based on this, a new user equipment (UE) designed for 5G NR is proposed to satisfy such needs for a mid-range IoT device. In the current 3rd Generation Partnership Project (3GPP) standardization, this new type of terminal is called a Reduced Capability UE. Since the RedCap UE has a reduction in capability or coverage capability, which results in coverage loss, coverage enhancement is needed. For example, for the RedCap UE, simulation evaluates that a Physical Downlink Control Channel (PDCCH), which is sent by means of broadcast, needs to be enhanced at 4 GHz. Coverage enhancement for the broadcast PDCCH can indicate performing a repetition in the time domain.

In related art, a period can have two slots used for monitoring type 0 Common Search Space (type 0 CSS), so that 2 repetition transmissions can be performed. However, for the broadcast PDCCH, 2 repetition transmissions may not compensate for the coverage loss, so occasions for repetition transmissions are to be extended.

In related art, for the broadcast PDCCH, a portion of the PDCCH may be transmitted in the type 0 CSS. In an implementation, within Frequency Range 1 (FR1), a transmission position of the type 0 CSS in the time domain is determined based on parameters O and M carried in a searched Synchronization Signal Block (SSB) and an index of the searched SSB. The parameters O and M can be determined based on indication information from a network side. An implementation of determining a transmission position of the broadcast PDCCH in the time domain is as follows.

A number (System Frame Number, SFN) of a wireless frame at which the type 0 CSS is located can be determined, where the SFN can be determined based on the following formulas: If $\lfloor (0 \cdot 2^{\mu} + \lfloor i \cdot M \rfloor)/N_{slot}^{frame,\mu} \rfloor$ mod 2=0, $SFN_c$ mod 2=0; and if $\lfloor (0 \cdot 2\mu + \lfloor i \cdot N \rfloor)/N_{slot}^{frame,\mu}$mod 2=1, $SFN_c$ mod 2=1.

μcan represent SubCarrier Spacing (SCS) parameter, and N can represent the number of slots included in a wireless frame for the SCS parameter p.

Slots at which the type 0 CSS is located are determined, and a start slot no for monitoring the broadcast PDCCH is determined. A terminal can perform monitoring for two consecutive slots starting from the start slot.

The start slot no for the type 0 CSS can be determined based on the following formula: $n_0 = (0 \cdot 2^{\mu} + \lfloor i \cdot M \rfloor)$mod $N_{slot}^{frame,\mu}$ It should be noted that $\mu \in \{0,1,2,3\}$.

For each slot, a start symbol for monitoring is determined. Generally, a start symbol for a terminal to perform monitoring is the 0-th symbol, and a time length for monitoring is a duration (represented as N_COREST) of Control Resource Set #0 (COREST #0), where the parameter of N_COREST can be determined based on the SSB.

However, in a case where a value of the parameter M indicated in the SSB is ½ and the index of the SSB is an odd number, the start symbol for monitoring is the N_COREST-th symbol. For example, if the SSB indicates that N_COR-EST is 2, the terminal starts monitoring from the second symbol.

Figure 2:
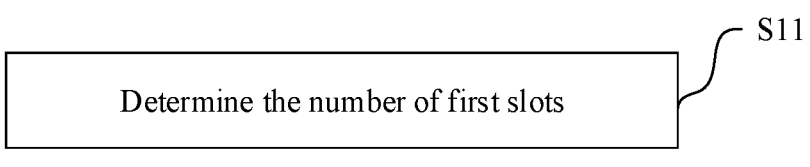
FIG. 2 is a flowchart illustrating a communication method according to an example embodiment.

FIG. 2 is a flowchart illustrating a communication method according to an example embodiment. As shown in FIG. 2, the method includes the following steps.

At step S11, the number of first slots is determined.

In the embodiments of the present disclosure, the number of first slots is the number of slots for monitoring the first type Common Search Space (CSS) within a first period, and the number of first slots is greater than the number of second slots. The number of first slots is the number of slots for a first type terminal to monitor the first type CSS within the first period, and the number of second slots is the number of slots for a second type terminal to monitor the first type CSS within the first period. The number of first slots is determined as N.

In some embodiments of the present disclosure, for example, the first type terminal can be a RedCap UE, and the RedCap UE can include one or two antennas and have relatively weak reception capability. The second type terminal, on the other hand, can be a common terminal with relatively high reception capability. For example, if the number of slots for the second type terminal to monitor the first type CSS during the first period is two, i.e., the number of second slots is two, it is determined that the number of slots for the first type terminal to monitor the first type CSS during the first period is greater than two, i.e., the number of first slots N is greater than two.

It is noted that the communication methods provided by the embodiments of the present disclosure can be applied to a terminal or to a network device, which is not specifically limited herein.

In the communication methods provided by the present disclosure, the number of slots for the first type CSS is increased, so that a plurality of repetition transmissions for a broadcast PDCCH can be realized to compensate for the coverage loss.

Figure 3:
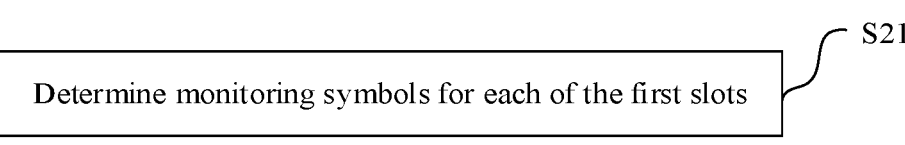
FIG. 3 is a flowchart illustrating another communication method according to an example embodiment.

FIG. 3 is a flowchart illustrating a communication method according to an example embodiment. As shown in FIG. 3, the communication method can be applied to a terminal and further includes the following steps.

At step S21, for each of the first slots, monitoring symbols are determined.

In the embodiments of the present disclosure, each first slot can include a plurality of monitoring symbols. The first slots can include the second slots, and in some possible embodiments, the first slots can also include one or more other slots. In other words, monitoring symbols in the first slots can be determined with two different manners separately, where monitoring symbols of a second slot included in the first slots are determined in one manner, and for other slot(s) included in the first slots other than the second slots, monitoring symbols thereof are determined in another manner.

FIG. 4 is a flowchart illustrating a communication method according to an example embodiment. As shown in FIG. 4, determining monitoring symbols for each slot of the first slots can include the following steps.

At step S31, for each of the second slots, monitoring symbols for the second slot are determined in a first manner.

At step S32, for each of one or more other slots besides the second slots in the first slots, monitoring symbols for the slot are determined in a second manner.

It is noted that step S31 and step S32 are merely numbered to differentiate two steps and do not represent the order in which these two steps are executed. These two steps may be executed together or one after the other in any possible way, which is not limited in the embodiments of the present disclosure.

In the embodiments of the present disclosure, the second manner is different from the first manner.

In one implementation, monitoring symbols in each second slot are determined in the first manner. The first manner includes, as described in the above embodiments, determining a SFN where type 0 CSS is located and determining slots where the type 0 CSS is located, thereby determining monitoring symbols in a second slot, i.e., 2 consecutive slots.

In one implementation, for other slot(s) besides the second slots in the first slots, monitoring symbols are determined in the second manner. In the second manner, a mapping correspondence of SSB mapping patterns and SubCarrier Spacing (SCS) is to be determined. For various mapping correspondences of SSB mapping patterns and SCS, corresponding monitoring symbols are different.

The first and second manners are not limited to being adopted simultaneously. That is, in a case that the above-mentioned first manner is adopted to determine monitoring symbols for each second slot, any manner may be taken as the second manner to determine monitoring symbols for other slot(s) except for the second slots in the first slots. In a case where any manner is taken as the first manner to determine the monitoring symbols for each second slot, the above-mentioned second manner may be adopted to determine the monitoring symbols for other slot(s) except for the second slots in the first slots.

FIG. 5 is a flowchart illustrating a communication method according to an example embodiment. As shown in FIG. 5, determining monitoring symbols for each slot in the first slots may include the following steps.

At step S41, a first set of monitoring symbols for each slot is determined based on a mapping correspondence of SSB mapping patterns and SCS.

In the embodiments of the present disclosure, an SSB mapping pattern is determined, and SCS of a PDCCH and a Physical Downlink Shared Channel (PDSCH) configured in the SSB is determined. The first set of monitoring symbols for each slot is determined based on a mapping correspondence of the SSB mapping pattern and the SCS.

For example, in response to an SSB mapping pattern being A and SCS being 15 kHz, it is determined that the first set of monitoring symbols includes symbol 6 and symbol 7. In response to an SSB mapping pattern being A and SCS being 60 kHz, it is determined that the first set of monitoring symbols includes symbol 2, symbol 3, symbol 4, symbol 5, symbol 6, and symbol 7.

Further, for determining the first set of monitoring symbols for each slot based on the mapping correspondence of SSB mapping patterns and SCS, reference can be made to Table 1.

TABLE 1

| SSB mapping pattern | SCS = 15k | SCS = 30k | SCS = 60k |
|---|---|---|---|
| A | 6, 7 | N_CORESET 2, 3 | 2, 3, 4, 5, 6, 7 |
| B | 6, 7 | 2, 3 | 2, 3, 4, 5, 6, 7 |
| C | 6, 7 | 2, 3, 6, 7 | 2, 3, 4, 5, 6, 7 |

It is understood that each element in Table 1 exists independently, and these elements are listed in the same table for an example, which does not mean that all elements in the table must exist simultaneously as shown in the table. For each of these elements, a value thereof is independent of a value of any other element in Table 1. Therefore, those skilled in the art can understand that the value of each element in Table 1 indicates an independent embodiment. The table provided in the embodiments of the present disclosure is merely an illustrative example of the present disclosure and is not a specific limitation of the present disclosure.

FIG. 6 is a flowchart illustrating a communication method according to an example embodiment. As shown in FIG. 6, the following steps are included.

At step S51, a start monitoring symbol is determined in the first set of monitoring symbols.

In the embodiments of the present disclosure, for example, a network device can determine a start monitoring symbol for a terminal from symbols included in the first set of monitoring symbols, and indicate the start monitoring symbol to the terminal through indication information. For example, with an SSB mapping pattern being A and SCS being 15 kHz, the first set of monitoring symbols includes symbol 6 and symbol 7, and it is determined that symbol 6 or symbol 7 is selected as the start symbol for monitoring.

In some embodiments of the present disclosure, for mapping correspondences of SSB mapping patterns and SCS, symbols included in corresponding first sets of monitoring symbols may be different. For example, with an SSB mapping pattern of B and SCS of 15 kHz, a corresponding first set of monitoring symbols includes symbol 6 and symbol 7. With an SSB mapping pattern of B and SCS of 30 kHz, a corresponding first set of monitoring symbols includes symbol 2 and symbol 3.

In one embodiment, for mapping correspondences of SSB mapping patterns and SCS, symbols included in corresponding first sets of monitoring symbols may be the same. For example, with an SSB mapping pattern of A and SCS of 15 kHz, a corresponding first set of monitoring symbols include symbol 6 and symbol 7. With an SSB mapping pattern of B and SCS of 15 kHz, a corresponding first set of monitoring symbols include symbol 6 and symbol 7.

In one embodiment, for mapping correspondences of SSB mapping patterns and SCS, corresponding first sets of monitoring symbols may include some identical symbols. For example, with an SSB mapping pattern of C and SCS of 15 kHz, a corresponding first set of monitoring symbols include symbol 6 and symbol 7. With an SSB mapping pattern of C and SCS of 30 kHz, a corresponding first set of monitoring symbols include symbol 2, symbol 3, symbol 6, and symbol 7. With an SSB mapping pattern of C and SCS of 60 kHz, a corresponding first set of monitoring symbols includes symbol 2, symbol 3, symbol 4, symbol 5, symbol 6, and symbol 7.

In the embodiments of the present disclosure, time-domain positions of symbols included in the first set of monitoring symbols are different from time-domain positions of SSB transmission resources, and are also different from time-domain positions of transmission resources of the first type CSS. As such, it is possible to alleviate a position conflict among time-domain positions of monitoring symbols included in the extended slot, the SSB transmission resources, and potential transmission resources of the first type CSS.

In the embodiments of the present disclosure, in response to determining that one or more slots other than the second slots in the first slots are used for an SSB transmission, the number of first slots is determined, and the one or more slots for the SSB transmission are determined. For each of the determined slot(s), as described above, based on a mapping correspondence of SSB mapping patterns and SCS, a first set of monitoring symbols for the slot is determined. In the first set of monitoring symbols, a start monitoring symbol is determined.

In the embodiments of the present disclosure, in response to a current duplexing mode being a Time Division Duplexing (TDD) mode, or in response to the current duplexing mode being the TDD mode and determining that other slot(s) except the second slots in the first slots is used for an SSB transmission, the number of first slots is determined. Other slot(s) for the SSB transmission besides the second slots is determined, and as described above, based on a mapping correspondence of SSB mapping patterns and SCS, a first set of monitoring symbols for each slot is determined. In the first set of monitoring symbols, a start monitoring symbol is determined.

In the embodiments of the present disclosure, in response to the current duplexing mode being a Frequency Division Duplexing (FDD) mode, it can be determined that, in the FDD mode, the first set of monitoring symbols corresponding to the first slot further includes a second set of monitoring symbols. The second set of monitoring symbols can include symbol 12 and symbol 13. For example, with an SSB mapping pattern of C and SCS of 60 kHz, a corresponding first set of monitoring symbols includes symbol 2, symbol 3, symbol 4, symbol 5, symbol 6, and symbol 7. In the FDD mode, with the SSB mapping pattern of C and the SCS of 60 kHz, the corresponding first set of monitoring symbols includes symbol 2, symbol 3, symbol 4, symbol 5, symbol 6, symbol 7, symbol 12, and symbol 13.

In the embodiments of the present disclosure, in an implementation, the number of first slots is predefined; in other words, the number of first slots is determined in a protocol.

In the embodiments of the present disclosure, in an implementation, the number of first slots is determined based on an SSB; in other words, the number of first slots is determined through an indication of other SSB(s).

For any one embodiment of the present disclosure, the embodiment may be applied to a terminal, to a base station, or to a network side device, which is not limited to the embodiments of the present disclosure.

The embodiments of the present disclosure may be performed alone or in any combination, which is not limited to the embodiments of the present disclosure.

Based on the same concept, the embodiments of the present disclosure further provide a communication device.

It can be understood that the communication device provided by the embodiments of the present disclosure includes, to realize the above functions, hardware structures and/or software modules corresponding to the execution of the functions separately. Combining units and algorithm steps of examples disclosed in the embodiments of the present disclosure, the embodiments of the present disclosure can be implemented in the form of hardware or a combination of hardware and computer software. Whether a certain function is executed in hardware or computer software-driven hardware depends on specific applications and design constraints for a technical solution. Those skilled in the art can use different ways to implement the described functions for each specific application, but such implementation should not be considered beyond the scope of technical solutions in the embodiments of the present disclosure.

FIG. 7 is a block diagram illustrating a communication device according to an example embodiment. Referring to FIG. 7, the communication device 100 includes a determining module 101.

The determining module 101 is configured to determine a number of first slots, where the number of the first slots includes a number of slots for monitoring the first type Common Search Space (CSS) within a first period, the number of the first slots is greater than a number of second slots, the number of the first slots includes the number of slots for a first type terminal to monitor the first type CSS within the first period, and the number of the second slots includes a number of slots for a second type terminal to monitor the first type CSS within the first period.

In the embodiments of the present disclosure, UE capability of the first type terminal is lower than UE capability of the second type terminal.

In the embodiments of the present disclosure, the determining module 101 is further configured to determine monitoring symbols for each of the first slots.

In the embodiments of the present disclosure, the first slots include the second slots, and determining the monitoring symbols for each of the first slots includes: determining, for each of the second slots, monitoring symbols for the second slot with a first manner; and determining, for each of one or more other slots besides the second slots in the first slots, monitoring symbols for the slot with a second manner; where the second manner is different from the first manner.

In the embodiments of the present disclosure, the determining module 101 is configured to determine, based on a mapping correspondence of Synchronization Signal Block (SSB) mapping patterns and SubCarrier Spacing (SCS), a first set of monitoring symbols for the slot.

In the embodiments of the present disclosure, the determining module 101 is further configured to determine a start monitoring symbol in the first set of monitoring symbols.

In the embodiments of the present disclosure, for mapping correspondences of SSB mapping patterns and SCS, symbols included in corresponding first sets of monitoring symbols are different.

In the embodiments of the present disclosure, time-domain positions of symbols included in the first set of monitoring symbols are different from time-domain positions of SSB transmission resources, and the time-domain positions of symbols included in the first set of monitoring symbols are different from time-domain positions of transmission resources of the first type CSS.

In the embodiments of the present disclosure, the determining module 101 is further configured to determine whether one or more slots other than the second slots in the first slots are for an SSB transmission.

In the embodiments of the present disclosure, the determining module 101 is further configured to determine that a duplexing mode is Time Division Duplexing (TDD).

In the embodiments of the present disclosure, the determining module 101 is further configured to determine that a duplexing mode is Frequency Division Duplexing (FDD), and determine that first sets of monitoring symbols corresponding to the first slots further include second sets of monitoring symbols in the FDD mode.

In the embodiments of the present disclosure, the determining module 101 is further configured to determine the number of the first slots as a predefined value, or determine the number of the first slots based on a Synchronization Signal Block (SSB).

With respect to the devices in the above-mentioned embodiments, specific manners in which various modules perform operations have been described in detail in embodiments relating to the methods, which will not be detailed herein.

Figure 8:
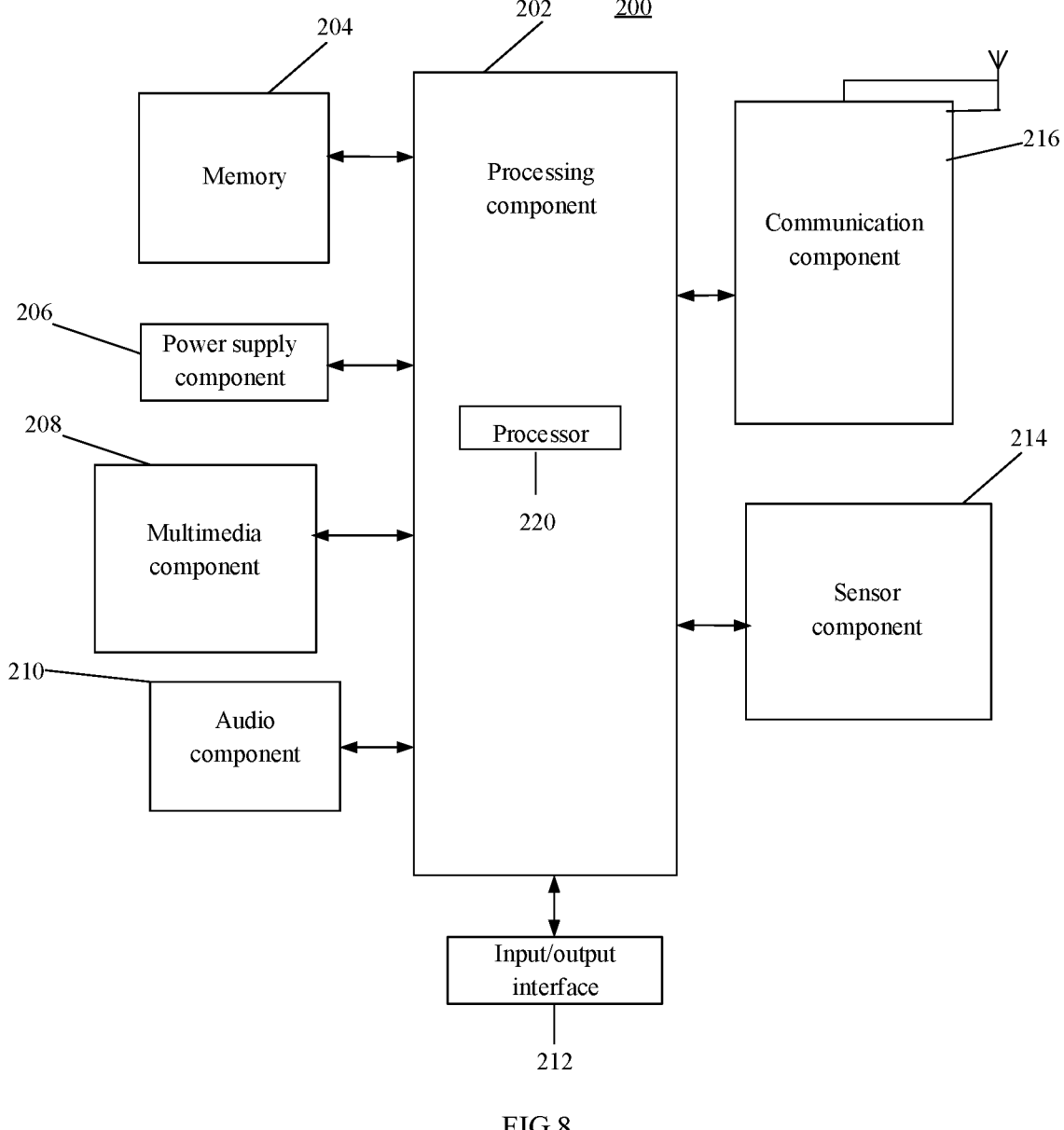
FIG. 8 is a block diagram illustrating a device for communication according to an example embodiment.

FIG. 8 is a block diagram illustrating device 200 for communication according to an example embodiment. For example, device 200 may be a mobile phone, computer, digital broadcasting terminal, message transceiver device, game console, tablet device, medical device, fitness device, personal digital assistant, etc.

Referring to FIG. 8, device 200 may include one or more of the following components: processing component 202, memory 204, power supply component 206, multimedia component 208, audio component 210, input/output (I/O) interface 212, sensor component 214, and communication component 216.

Processing component 202 generally controls overall operations of device 200, such as operations associated with display, phone calls, data communications, camera operations, and recording operations. Processing component 202 may include one or more processors 220 to execute instructions to complete all or part of the steps of the above methods. In addition, processing component 202 may include one or more modules that facilitate the interaction between processing component 202 and other components. For example, processing component 202 may include a multimedia module to facilitate the interaction between multimedia component 208 and processing component 202.

Memory 204 is configured to store various types of data to support the operation of device 200. Examples of such data include instructions for any application or method operated on device 200, contact data, phonebook data, messages, pictures, videos, and so on. Memory 204 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

Power supply component 206 supplies power for different components of device 200. Power supply component 206 may include a power supply management system, one or more power supplies, and other components associated with generating, managing, and distributing power for device 200.

Multimedia component 208 includes a screen that provides an output interface between device 200 and a user. In some embodiments, the screen may include a Liquid Crystal Display (LCD) and a Touch Panel (TP). If the screen includes a TP, the screen can be implemented as a touch screen to receive input signals from the user. The TP can include one or more touch sensors to sense touch, sliding, and gestures on the touch panel. The touch sensors can not only sense boundaries of touch or sliding operations, but also detect a duration and pressure related to the touch or sliding operations. In some embodiments, multimedia component 208 includes a front camera and/or a rear camera. When device 200 is in an operation mode, such as a shooting mode or a video mode, the front camera and/or the rear camera may receive external multimedia data. Each of the front and rear cameras may be a fixed optical lens system or have a focal length and an optical zoom capability.

Audio component 210 is configured to output and/or input audio signals. For example, audio component 210 includes a microphone (MIC) configured to receive an external audio signal when device 200 is in an operation mode, such as a call mode, a recording mode, and a voice recognition mode. The received audio signal may be further stored in memory 204 or transmitted via communication component 216. In some embodiments, audio component 210 also includes a loudspeaker for outputting an audio signal.

I/O interface 212 provides an interface between processing component 202 and a peripheral interface module which may be a keyboard, a click wheel, buttons, or the like. These buttons may include, but are not limited to a home button, a volume button, a start button, and a lock button.

Sensor component 214 includes one or more sensors for providing a status assessment in various aspects to device 200. For example, sensor component 214 may detect an open/closed state of device 200, and the relative positioning of components, for example, the component indicates a display and a keypad of device 200. Sensor component 214 may also detect a change in position of device 200 or a component of device 200, the presence or absence of a user in contact with device 200, the orientation or acceleration/deceleration of device 200 and a change in temperature of device 200. Sensor component 214 may include a proximity sensor configured to detect the presence of nearby objects without any physical contact. Sensor component 214 may also include a light sensor, such as a CMOS or CCD image sensor, for use in imaging applications. In some embodiments, sensor component 214 may also include an acceleration sensor, a gyro sensor, a magnetic sensor, a pressure sensor, or a temperature sensor.

Communication component 216 is configured to facilitate wired or wireless communication between device 200 and other devices. Device 200 may access a wireless network based on a communication standard, such as WiFi, 2G, 3G, 4G or 5G, or a combination thereof. In an example embodiment, communication component 216 receives broadcast signals or broadcast associated information from an external broadcast management system via a broadcast channel. In an example embodiment, communication component 216 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example embodiment, device 200 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above methods.

In an example embodiment, there is also provided a non-transitory computer readable storage medium including instructions, for example, memory 204 that includes instructions, where the instructions are executable by processor 220 of device 200 to perform the methods as described above. For example, the non-transitory computer readable storage medium may be ROM, RAM, CD-ROM, magnetic tape, floppy disk, and optical data storage device and the like.

Figure 9:
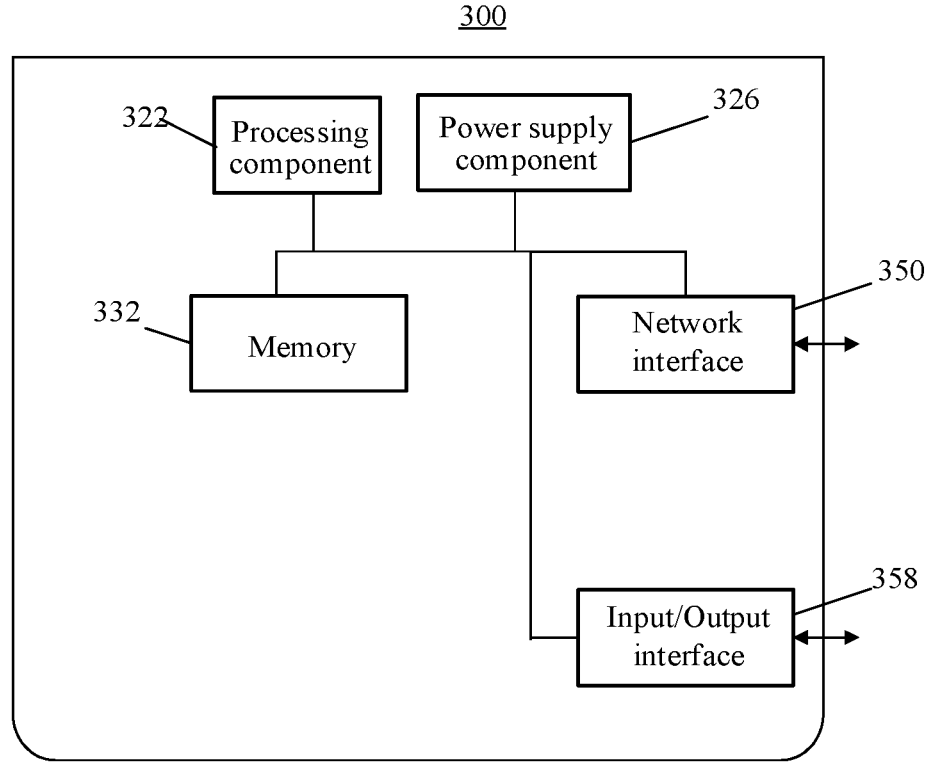
FIG. 9 is a block diagram illustrating a device for communication according to an example embodiment.

FIG. 9 is a block diagram illustrating device 300 for communication according to an example embodiment. For example, device 300 can be provided as a base station. Referring to FIG. 9, device 300 may include processing component 322 which further includes one or more processors, and memory resources represented by memory 332 for storing instructions (for example, applications) that can be executed by processing component 322. The applications stored in memory 332 can include one or more modules, each corresponding to a set of instructions. Further, processing component 322 is configured to execute the instructions to perform the communication methods described above.

Device 300 may also include power supply component 326 configured to perform power management on device 300, wired or wireless network interface 350 configured to connect device 300 to a network, and Input-Output (I/O) interface 358. Device 300 can perform operations based on an operating system stored in memory 332, such as Windows Server™, Mac OS X™, Unix™, Linux™, FreeBSD™, or the like.

It is further understood that "plurality" in the present disclosure refers to two or more, and other quantifiers are similar. "And/or", describing an association of associated objects, indicates that three relationships can exist, e.g., A and/or B can indicate A alone, both A and B, and B alone. Character "/" generally indicates that associated objects before and after are in an "or" relationship. Terms determined by "a", "the" and "said" in their singular forms are also intended to include plurality, unless clearly indicated otherwise in the context.

It is further understood that, although the terms first, second and the like may be used herein to describe various information, the information should not be limited by these terms. These terms are only used to distinguish one category of information from another and do not indicate a particular order or level of importance. In fact, the expressions "first" and "second" can be used interchangeably. For example, without departing from the scope of the present disclosure, first information may be referred as second information, and similarly, second information may be referred as first information as well.

It is further understood that, in the embodiments of the present disclosure, although operations are described in a particular order in the accompanying drawings, this should not be understood as requiring executing the operations in the shown particular order or serial order, or executing all the operations shown to obtain a desired result. In particular environments, multitasking and parallel processing may be advantageous.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are considered as examples only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited by the appended claims.

The invention claimed is:

1. A communication method, comprising:
determining a number of first slots, wherein the number of the first slots comprises a number of slots for monitoring first type Common Search Space (CSS) within a first period, the number of the first slots is greater than a number of second slots, wherein the first type CSS is a type 0 CCS,
the number of the first slots comprises the number of slots for a first type terminal to monitor the first type CSS within the first period, and the number of the second slots comprises a number of slots for a second type terminal to monitor the first type CSS within the first period,
wherein the first slots comprise the second slots, and the method further comprises:
determining, for each of the second slots, monitoring symbols for the second slot with a first manner; wherein the first manner comprises determining a System Frame Number, SFN, of a frame where the type 0 CSS is located, determining slots where the type 0 CSS is located, and determining the monitoring symbols for the second slot; and
determining, for each of one or more other slots besides the second slots in the first slots, monitoring symbols for the slot with a second manner; wherein determining the monitoring symbols for the slot with the second manner comprises: determining, based on a mapping correspondence of Synchronization Signal Block (SSB) mapping patterns and SubCarrier Spacing (SCS), a first set of monitoring symbols for the slot; and wherein for mapping correspondences of SSB mapping patterns and SCS, symbols comprised in corresponding first sets of monitoring symbols are different.

2. The communication method according to claim 1, wherein UE capability of the first type terminal is lower than UE capability of the second type terminal.

3. The communication method according to claim 1, further comprising:

determining a start monitoring symbol in the first set of monitoring symbols.

4. The communication method according to claim 1, wherein time-domain positions of symbols comprised in the first set of monitoring symbols are different from time-domain positions of SSB transmission resources, and the time-domain positions of symbols comprised in the first set of monitoring symbols are different from time-domain positions of transmission resources of the first type CSS.

5. The communication method according to claim 1, prior to determining the number of the first slots, the method further comprising:

determining whether one or more slots other than the second slots in the first slots are for an SSB transmission.

6. The communication method according to claim 1, prior to determining the number of the first slots, the method further comprising:

determining that a duplexing mode is Time Division Duplexing (TDD).

7. The communication method according to claim 1, prior to determining the number of the first slots, the method further comprising:

determining that a duplexing mode is Frequency Division Duplexing (FDD), and determining that first sets of monitoring symbols corresponding to the first slots further comprise second sets of monitoring symbols in the FDD mode.

8. The communication method according to claim 1, wherein the number of the first slots is a predefined value; or the number of the first slots is determined based on a Synchronization Signal Block (SSB).

9. A communication device, comprising:

a processor; and a memory storing instructions executable by the processor;

wherein the processor is configured to perform operations comprising:

determining a number of first slots, wherein the number of the first slots comprises a number of slots for monitoring first type Common Search Space (CSS) within a first period, the number of the first slots is greater than a number of second slots, wherein the first type CSS is a type 0 CCS, the number of the first slots comprises the number of slots for a first type terminal to monitor the first type CSS within the first period, and the number of the second slots comprises a number of slots for a second type terminal to monitor the first type CSS within the first period;

wherein the first slots comprise the second slots, and the operations further comprise:

determining, for each of the second slots, monitoring symbols for the second slot with a first manner; wherein the first manner comprises determining a System Frame Number, SFN, of a frame where the type 0 CSS is located, determining slots where the type 0 CSS is located, and determining the monitoring symbols for the second slot; and determining, for each of one or more other slots besides the second slots in the first slots, monitoring symbols for the slot with a second manner; wherein determining the monitoring symbols for the slot with the second manner comprises: determining, based on a mapping correspondence of Synchronization Signal Block (SSB) mapping patterns and SubCarrier Spacing (SCS), a first set of monitoring symbols for the slot; and wherein for mapping correspondences of SSB mapping patterns and SCS, symbols comprised in corresponding first sets of monitoring symbols are different.

10. A non-transitory computer readable storage medium, wherein when instructions in the storage medium are executed by a processor of a mobile terminal, the mobile terminal is caused to perform operations comprising:

determining a number of first slots, wherein the number of the first slots comprises a number of slots for monitoring first type Common Search Space (CSS) within a first period, the number of the first slots is greater than a number of second slots, wherein the first type CSS is a type 0 CCS, the number of the first slots comprises the number of slots for a first type terminal to monitor the first type CSS within the first period, and the number of the second slots comprises a number of slots for a second type terminal to monitor the first type CSS within the first period;

wherein the first slots comprise the second slots, and the method further comprises:

determining, for each of the second slots, monitoring symbols for the second slot with a first manner; wherein the first manner comprises determining a System Frame Number, SFN, of a frame where the type 0 CSS is located, determining slots where the type 0 CSS is located, and determining the monitoring symbols for the second slot; and determining, for each of one or more other slots besides the second slots in the first slots, monitoring symbols for the slot with a second manner; wherein determining the monitoring symbols for the slot with the second manner comprises: determining, based on a mapping correspondence of Synchronization Signal Block (SSB) mapping patterns and SubCarrier Spacing (SCS), a first set of monitoring symbols for the slot; and wherein for mapping correspondences of SSB mapping patterns and SCS, symbols comprised in corresponding first sets of monitoring symbols are different.

11. The communication device according to claim 9, wherein UE capability of the first type terminal is lower than UE capability of the second type terminal.

12. The communication device according to claim 9, the operations further comprising:

determining a start monitoring symbol in the first set of monitoring symbols.

* * * * *